July 24, 1934.  H. J. MURRAY  1,967,681
RADIO SELECTIVE CONTROL SYSTEM
Filed Sept. 20, 1924  2 Sheets-Sheet 2
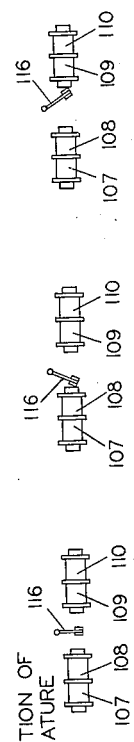
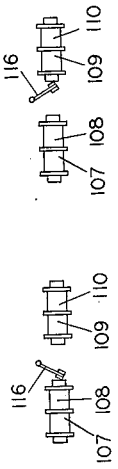
INVENTOR
HOWARD J. MURRAY
BY
Warren S. Orton
ATTORNEY Patented July 24, 1934

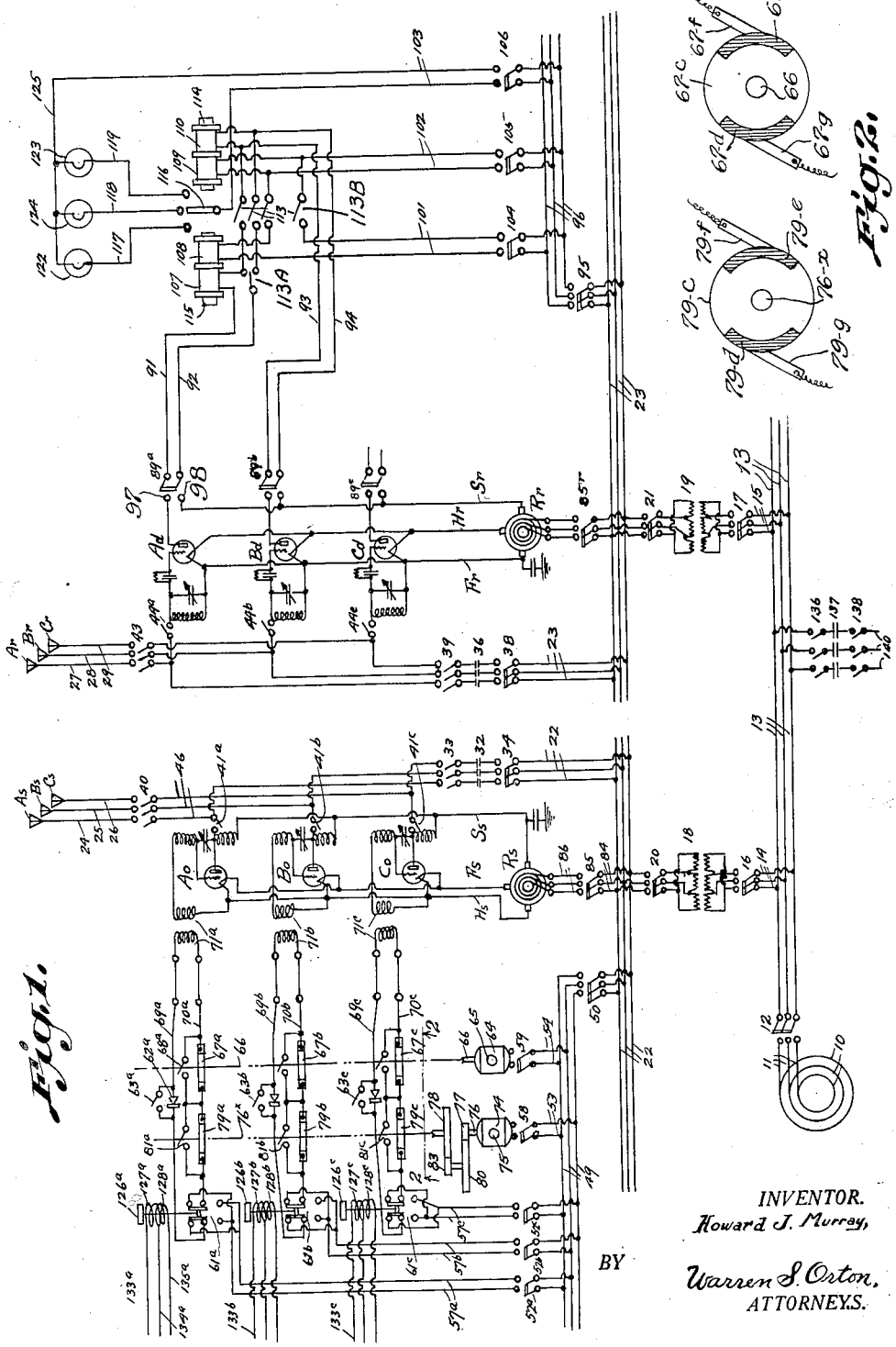

1,967,681

UNITED STATES PATENT OFFICE 1,967,681

RADIO SELECTIVE CONTROL SYSTEM

Howard J. Murray, Brooklyn, N. Y., assignor to R. M. Company, Inc., East Pittsburgh, Pa., a corporation of Delaware Application September 20, 1924, Serial No. 738,927

12 Claims. (Cl. 177—352)

My invention relates in general to the remote selective control of electrically actuated devices by means of combined action of wire transmitted energy and wire or space transmitted energy, and the invention specifically relates to the combined use of both high and low frequency energy to select and operate the said electrical devices.

The primary object of the invention is to provide a wave forming and combining device designed to be selectively affected by superimposing upon transmitted energy a wave or portion thereof approximately similar in form and frequency to the wave form of a certain transmitted energy.

Another object of the invention is to provide a wave forming and producing device designed to supply in the so-called transmitter circuit of an energy transmitting station a varying wave or portion thereof arranged to be superimposed in effect upon the said transmitted energy. Said wave or portion thereof having a similar form and frequency to those of the wave of a certain wire transmitted energy.

Still another object of the invention is to provide a differential polarized relay or equivalent designed to be selectively operated by either half or a portion thereof of a cycle of electric energy whereby wire or space transmitted energy of a desired wave length having superimposed upon it in effect an alternating wave or portion thereof may when properly amplified and rectified affect the said relay to selectively actuate a plurality of current controlled devices.

A further object of the invention is to provide a device or devices arranged to transmit, detect and amplify carrier current or oscillations of various wave lengths, said carrier current or oscillations having superimposed upon them in effect alternating waves in whole or in portion of various frequencies and angular displacements relative to each other and to transmitted waves of polyphase energy.

A still further object of the invention is to provide a suitable means for rectifying, reversing, interrupting, grouping and combining the cycles or portions thereof of desired alternating current so that each alternation or a portion thereof of each cycle of each phase may be impressed upon wire or space transmitted energy to be reproduced at a desired remote point.

The present invention therefore proposes to employ an alternating current power supply system producing a low frequency or "heating" current; and to derive therefrom wave portions and wave trains having a certain substantially synchronized relationship with the waves of the supply system. At the distant or receiving station, devices are provided energized from the low frequency power supply system in balanced relationship. At the central sending or controlling station, in the illustrative form, means are likewise connected to the supply system to derive current therefrom to produce a carrier current or currents modulated by the wave portions and wave trains, so that the modulated carrier current may be transmitted over a channel to the distant or receiving station, either by radio or by wire, as, for example, by the wires of the power supply system itself. At the receiving station are provided means for separating out the modulants from the carrier waves, and for employing these modulants to produce a desired signal; this production being accomplished according to the illustrative form by counterbalancing the effect of the low frequency or heating current in one part of a relay having balanced windings, so that the armature of this relay will operate to close a signal circuit by the energization from the low frequency supply in the other winding. By controlling the time and period of the trains of selective wave fractions, as by a second chopping device which closes successive contacts at intervals of say 10, 20, 30 etc. seconds, according to the illustrative form, the signal lights of a traffic signal system are caused to change at corresponding times. In this way a cyclic operation is obtainable by modulants derived from the same low frequency supply which energizes the balanced relay, and hence the modulant and the low frequency currents in the relay always remain in substantial synchronism with each other since they are derived from the same original source of alternating current supply.

It is evident that if the same source of alternating current is used to furnish both the superimposed energy and the local relay energy that the rectified and amplified transmitted wave will be in desired synchronism with the relayed energy. It is also evident that either half or any portion of the said alternating wave may be transmitted so as to aid or oppose in effect either half or any portion of the local transmitted wave without requiring variation of the transmitted energy wave length or locally adjusting the receiver.

In addition the transmitted superimposed wave may be varied in form, frequency and angular position relative to the local wave and any desired resultant wave created in combination with a local transmitted wave to thereby selectively affect a local circuit control device.

In present known forms of remote control by alternating current it is necessary to furnish additional conductors, vary the strength of the current, or interrupt same. My invention permits the selective remote control of a plurality of receivers on a given distribution system without disturbing the normal electrical status of the said system or the addition of conductors... Remote control of current devices by transmitted energy of a given wave length as now known is limited to a given single operation. My invention permits of a plurality of operations selectively controlled by transmitted energy of a given wave length.

A more specific example of the embodiment of my invention may be found in a traffic control system for movable vehicles. The receiving sets in this case would be installed on the street lighting fixtures at each street intersection, and the so-called positive alternation of a given phase could be transmitted to operate the "go" signal, the negative alternation the "stop" signal, both alternations the "cross" signal, and no transmitting would render the traffic signal inoperative. Different wave lengths would control different sets of signals which would be additionally selective on different phases.

As the invention is admirably suited to a traffic control system the invention will be described in connection therewith although it is obvious that it may be used for any control condition, as for example to control automatic sub-stations, to remotely synchronize electrical machines, to adjust electric time clocks, to turn off or on lighting circuits, operate wave devices at a distance, as a train control device, as a remote recording device, as a remote indicating device, and in fact to remotely control any known current consuming device.

Various other objects and advantages of this invention will in part be obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings there is shown in Fig. 1 diagrammatic form a preferred embodiment of the invention with the several mechanical parts shown symbolically together with the necessary electrical connections but it is obvious and is hereby understood that the showing is merely suggestive and must be modified to meet the peculiar requirements of the different systems of distribution and transmitting and receiving upon which it is to be installed and used; and Fig. 2 is an enlarged detail view in cross section of the wave choppers and taken on the line 2—2 of Fig. 1.

Figs. 3 to 7 are explanatory views of the flux curves of the differential relay under the several operative conditions; Figs. 3, 4 and 5 showing the resultant curves when full waves are transmitted and Figs. 6 and 7 showing the resultant flux curves when one half or other fractional parts of waves are transmitted.

In the drawings there are shown certain conventional parts now found and used in power distributing polyphase systems and in radio broadcasting and receiving systems.

In the drawings, a three-phase system has been described, and throughout the illustration of the presently operated parts, the upper horizontal wire and the vertical left hand wire represent one phase conductor, and insofar as distinction is made for illustrative reasons between the conductors, this has been designated the "A, a" conductor, and reference numerals to parts have received the suffix "a" to indicate that such parts are peculiar to this phase conductor or phase. Correspondingly, the central conductor has been designated by the letters "B, b"; and the lower or right hand conductor by the letters "C, c".

For instance there is shown a source of electric energy 10 connected to a bus 11, a three pole switch 12, a polyphase transmission line 13, secondary transmission lines 14 and 15, secondary switches 16 and 17, transformers 18 and 19, secondary switches 20 and 21, and local distribution lines 22 and 23. It is to be further assumed that the system is equipped with the usual protection and remote control means and all other apparatus as is well known in the power distribution art. It is to be understood for instance that all the switches shown in the drawings may be remotely controlled by manual or automatic means such as known in the art. These have been omitted merely to simplify the drawings.

There is also shown in conventional form space broadcasting antennæ 24, 25 and 26, and receiving antennæ 27, 28 and 29. In addition there is shown means for impressing wired radio broadcasting on a power distribution system in the form of condensers 32, and three pole switches 33 and 34. Similar means are shown for receiving from a given power system as indicated by condensers 36, and three pole switches 38 and 39. In passing it should be noted that all of the three pole switches shown in the drawings may be operated singly or as a unit.

Hence by the use of switches 33 and 34 or 40 and 41 it is possible to transmit by space or wire and by oscillation or carrier current from a transmitting station. This broadcasting station has been illustrated solely by way of example as being connected to the local bus wires 22 for receiving low frequency current of energization which passes by the conductors 84, switch 85 and conductors 86 to a three-phase double potential current rectifier $R_s$ which supplies low potential cathode exciting current by the conductor $H_s$ and high potential space or anode current by the conductor $S_s$, to the three oscillator-modulator units designated $A_o$, $B_o$, $C_o$, and shown by way of example as receiving input modulating current through transformers $71a$, $71b$, $71c$, respectively, and delivering the outputs to the respective terminals or switches $41a$, $41b$, $41c$. The common return line $F_s$ leads back to the rectifier $R_s$. It will be understood that the respective oscillator units $A_o$, $B_o$ and $C_o$ correspond to the phases "a, b, c" heretofore referred to, and that each of these oscillator units operates at a different frequency.

Similarly, a receiving station is provided which is connected to receive its current from the local bus wires 23 through a switch $85r$. The three-phase double potential rectifier $R_r$ delivers heating current through the conductor $H_r$ and anode or space current through the conductor $S_r$, while a common return $F_r$ leads to the common brush. These heating and space currents are employed in the receiving device comprising the necessary radio and audio frequency amplifiers and detectors and designated by the letters $A_d$, $B_d$, $C_d$, respectively, responding to the carrier currents emitted from the oscillators $A_o$, $B_o$, $C_o$ and delivering the detected or de-modulated wave portion passed to the respective modulants $A_o$, $B_o$, Co, at the output terminals of the respective detector and amplifying devices Ad, Bd, Cd, for example, to the switches 89a, 89b, 89c. Such transmitting and receiving systems are illustrated, by way of example, as showing means for creating oscillations or carrier currents for transmission of the same by any channel such as the phase wires of the low frequency power supply, or by the associated antenna systems As, Bs and Cs at the sending station to the corresponding antenna systems Ar, Br and Cr at the receiving station.

The disclosure up to this point has largely featured known practice to be used in combination with new and novel features to be hereinafter described.

In the drawings there is shown what will be hereinafter referred to as a wave forming and control device containing a local polyphase bus 49 connected to the local distribution branch 22 by means of switches 50. Attached to this bus by means of switches 52a, 52b, 52c, 58, 59 inclusive are single phase supply lines 57a, 57b, 57c and the motors 64, 74, the supply lines being arranged to supply any one of the phases of the said polyphase system to any one of the devices hereinafter described as forming a portion of the said wave control device. Current reversing switches 61a, 61b, 61c are attached to circuits 57a, 57b, 57c and may be of the conventional form for the purpose of this description. In circuit with the reversing switch 61a is an alternating current rectifier which is shown conventionally at 62a and may be of any known type such as the electrolytic form. Hence by the proper actuation of the said reversing switch 61a either alternation of an alternating current cycle may be obstructed by the said rectifier 62a. Short circuiting switches 63a, 63b, 63c are also provided whereby the effect of the rectifier may be removed from the corresponding circuit. Attached to circuit 54 through the switch 59 is an alternating current motor 64 having a suitable speed control element 65, a shaft 66 and adjustable commutators 67a, 67b, 67c. These commutators have respective brushes for connecting them in circuit whereby they deliver to such respective circuits selected portions of the low frequency waves coming to them from the bus wires 49 through the respective switches 52, 52b, 52c. By operating the said motor 64 from any one of the phases of the said system it is evident that any portion or all of the alternation permitted to flow through the said rectifier 62a may be prevented from flowing in the conductors 69a and 70a to the input transformer 71a of the transmitting station. It is also apparent that the motor may run in or out of synchronism and the effect of the commutator may or may not be similar on successive waves and that the effect of the short circuiting switch 68a may eliminate the action of the commutator 67a from the said circuit altogether.

When the rectifier short circuiting switches 63a, 63b, and 63c are closed, no rectifying action occurs. As a result the complete cycle of the alternating current is superimposed on the particular carrier current associated with the same, and will appear in the plate circuit of the detecting element Ad. In this event alternating current will flow in all of the windings 107, 108, 109, and 110. Alternating plate current will flow in windings 107 and 110 with proper adjustments of switches and in windings 108 and 109 alternating power current will flow according to the status of switches 104 and 105. Thus a plate current is magnetically associated with a synchronous power current, in an additive or subtractive sense to thereby affect the armature 116. When the rectifier switches 63a, 63b, and 63c are opened, the power currents from the various supply conductors are subjected to rectification as described hereinbefore. In this event the currents in the plate circuits of elements Ad, Bd, and Cd will not be similar to the alternating currents taken from the supply circuits 57a, 57b and 57c, and the resultant effect of these currents on the armature 116 will not be the same as when the rectifying switches 63a, 63b and 63c are closed. For example, two alternating currents of the same synchronous frequency may be impressed on the windings 107 and 108 so that the magnetic effect on the armature 116 may be neutralized, or the magnetic effect may be combined.

Attached to the circuit 53 through the switch 58 is a second alternating current motor 74 having a speed control element 75, a shaft 76, a system of speed changing gears 77, 78, 80 and 83 to drive a shaft 76x at a lower speed, the shaft having thereon commutating devices 79a, 79b, 79c short circuited when desired by switches 81a, 81b, 81c. By means of the device 79a for example a group or wave train of the alternations or portions thereof affected by commutator 67a may be permitted to flow through the conductors 69a and 70a for a given interval or may be prevented from flowing at desired intervals. The circuit 57a is shown connected to a given phase of bus 49 and the circuits 57b, 57c may be connected to the others of the three phases and the apparatus described may be duplicated for each phase of the said system and thereby each alternation or portion of each cycle of each phase may be delivered to the said transmitting station for desired lengths of time or varying lengths of time for varying portions of any of the said alternations.

It is assumed that there are three phases in the system shown and accordingly three transformers 71a, 71b, 71c would be required to suitably connect the said wave control device to the said broadcasting set. There is also shown a source of supply 84 connecting to the said transmission system 13 and by switch 85 and terminals 86 to the said transmitting station thereby to supply power as desired for transmitting the above named energy as has been described above.

By suitably superimposing the above described alternations or portions thereof flowing in the so-called transmitter circuit of the transmitting station on the transmitted oscillations or carrier currents of station I am able to transmit by suitable operation of switches 33, 34, 40, 41a, 41b, 41c from antennæ 24, 25 and 26 by space to antennæ 27, 28 and 29, and from condensers 32 by wire to condensers 36. By suitable operation of switches 38, 39, 43, 44a, 44b, 44c this transmitted energy could be brought to input terminals of the receiving set.

As hereinbefore stated the method of receiving, rectifying and amplifying the said oscillations and carrier currents is no part of this invention except as required to complete a cycle of operation. The method shown of switching from space to wire transmitting is claimed as new and novel when considered in combination, but it is admitted that all the specific parts when individually considered are old and known in the art, and so for the purpose of this description let it be assumed that there is delivered to the output terminals or switches 89a, 89b, 89c of the receiver varying unidirectional currents preferably flowing in the plate circuit or circuits of the said receiver. In the case of a single phase system only one set of the said terminals would be required, but in the case of a polyphase system a set of terminals would be required for each phase. Hence in this particular application to a three phase system three sets of such terminals would be necessary. The three circuits are connected to a wave combining device by means of switches 89a, 89b, 89c.

This wave combining device is provided with a bus 96 which connects to the local distribution branch 23 by means of switches 95 and in turn supplies circuits 101, 102, and 103, by means of switches 104, 105, and 106. It is evident that the circuits 101, 102 and 103 may be arranged to connect to any of the phase circuits of the said polyphase power system, so by changing the connections of switch 104 there is available a plurality of currents on circuit 101, being the various currents of the said polyphase source of power 10 and on conductors 91, 92 and 93, 94 a plurality of currents constituting the reproduced alternations or portions thereof of each alternation of each cycle of each phase of the said polyphase power system either in or out of synchronism according to the portions superimposed on the so-called transmitter circuit of the transmitting set due to the action of the wave control device.

These various currents are led by suitable conductors to what constitutes in effect a differential polarized relay having flux paths 114 and 115, and in addition another path (not shown). These paths 114 and 115 may be combined in many ways but let it be assumed that in this particular showing they together form a portion of one complete path. Also forming a portion of this said path is a pivoted armature 116 similar to pivoted armatures usually found in polarized relays known in the art. It is assumed that the action of polarized relays is known and accepted in the art and that no description of the action of such a relay will be required.

Coiled about the flux path 114 are windings 109 and 110, and coiled about flux path 115 are windings 107 and 108. Coils 108 and 109 form a portion of circuits 101 and 102 and by means of switches 113, and 105 may be arranged in series on circuit 101. It is assumed that the said coils are equal magnetically when in circuit electrically in series or in parallel. Coils 107 and 110 form portions of plate circuits 91, 92, 93 and 94 and by proper arrangement of switches 113 may be placed in series on circuit 91 and 92 so as to be equal magnetically relative to the flux paths 114 and 115.

The single throw double throw switch 113—A permits the plate current from the Ad detector unit to be passed through the relay winding 107 when the switch blade thereof is on the upper contact. When the switch blade of switch 113—B is on the lower contact, and the two upper blades of switch 113 are closed the plate current from the element Ad will flow through the relay windings 107 and 110 in series. If the switch 89b is also closed when the switches 113 and 113—A are in this status then it is evident that current from both the elements 89a and 89b may be combined into a resultant current thereby to affect the winding of coils 107 and 110.

When the lowermost blade of switch 113 and the switch blade of switch 113—B are closed, power current is supplied to the relay windings 108 and 109. For instance when switch 105 is closed, a power current will flow through the windings of winding 109. This current will be of a phase corresponding to the middle and lower conductors of the supply feeders 96. When switch 105 is opened, and switch 104, switch 113—B and the lower blade of switch 113 closed, then current of a phase corresponding to the lower and upper conductors of feeders 96 will flow in series through the relay windings 108 and 109. The switches 104 and 105 are used in general to select any phase of the power line, or a combination of currents of different phases so that by the proper selection of the open or closed position of the said switches the same may be differentially combined magnetically with combinations of plate currents from the elements Ad, Bd and Cd. These plate currents may thus be in synchronism with the selected power current, or any particular plate current may be in some phase relation to the selected power current. It is obvious that the plate currents will have the same phase relation as the power currents from which they are taken at the sending station, and that any combination of phase relations may be obtained at the receiving end by the proper actuation of the switches 89a, 89b, 104, 105, 113, 113—A and 113—B.

It is obvious that the winding 107 may have flowing in it a reproduced wave displaced relatively from the wave flowing in winding 110 or the wave flowing in 107 may be in synchronism with the wave flowing in the winding 110 or any number of windings may be placed upon the flux circuit formed by the elements 114 and 115 to produce a resultant magnetic effect on the said armature 116. But the windings 108 and 109 also produce magnetic flux in the said path to thereby affect the said armature. If the flux from the coils 108 and 109 adds to the flux produced by the coils 107 and 110 the effect on the armature 116 is accordingly increased, but if the said flux of coils 107 and 110 is equal and opposite to the flux produced by coils 108 and 109 no effect is produced on the said armature.

Now it is also evident that coils 107 and 110 may be electrically in series and thus produce opposing magnetic flux which may or may not neutralize their effect on the said armature 116. However for the purpose of this description let it be assumed that the coils 108 and 109 are in series on the same phase and produce equal and opposite magnetic flux. No movement of the said armature will result.

Now if a reproduced wave transmitted at station 42 from the same source of phase power is flowing in the coils 107 and 110 it will be in synchronism with one of the alternations or a portion thereof of the said cycle. If in synchronism with the so-called positive alternation the armature 116 will be pulled say to the right, and if in synchronism with the so-called negative alternation the said armature will be pulled to the opposite direction or to the left. Thus a selective action is given to the said armature 116 according to which alternation or portion thereof of the said phase cycle is rectified by the devices 62a, 62b, 62c in the wave control device and transmitted by the sending station. It should be apparent that each phase may be used to control individual relays, or that phases may be combined to selectively affect the same relay, and that contacts may be combined to further increase the number of definite selections possible by combining alternations, phases, wave lengths, and magnetic flux paths.

When the said armature 116 is pulled to the right, current will flow from a phase conductor of the bus 96 through a wire 103 to the armature switch blade 116, by conductor 119 to signal 123, with a return by wires 125 and 103 to another phase conductor of bus 96, so long as the switch 106 is closed. Similarly, when the armature switch blade 116 is pulled to the left, the current from conductor 103 will flow by the left hand terminal and conductor 117 to the signal device 122 and thence back to the same phase conductor as before through the wires 125, 103 and switch 106. If the fluxes in the two paths 114 or 115 of the relay are balanced, which may occur either by the absence of current from the two windings 107 and 110 or by the presence of equal currents therein, the switch blade 116 will occupy a central position and the current from one wire 103 will flow through conductor 118 to the third indicating device 124 and thence back by wires 125 and 103 as before.

If device 122 is an electric lamp of a traffic signal system as are also devices 123 and 124 it is apparent that any one of the same may be selectively lighted for desired intervals by means of manual or automatic transmitter circuit control at the wave control device 48, and that any number of sets of devices as unit 121 may be controlled from the same station by combining alternations, phases, wave lengths, flux paths and contacts as hereinbefore stated.

The method of operation of the device under the conditions set forth above may be described as follows by way of illustration. When the main station switch 12 is closed polyphase current will be permitted to flow from the polyphase generator 10 through the station leads 11 to the general transmission supply line 13. The line 13 consists of three conductors as is usual in the event of three phase transmission of current. The said transmission line is shown connected to the local three phase bus 22 when the three-pole single-throw switches 16 and 20 are closed through the branch leads 14. The voltage impressed on the local bus 22 may be the same or a different voltage than that produced by the generator 10 due to the action of the transformers 18. At the same time the transmission line 13 also supplies the remote bus 23 at the same or at a different voltage due to the inductive action of the transformer 19 when the three-pole single-throw switches 17 and 21 are closed. In addition the transmission line 13 may also be connected to a second transmission line 140 through condensers 137 when the three-pole single-throw switches 136 and 138 are closed.

At the control or sending station the local bus 22 is connected to the control station bus 49 when the three-pole single-throw switch 50 is closed. Now let it be assumed that the generator 10 is connected so that when the three-pole switches such as 12, 16, 20, and 50 are closed alternating current of a so-called "a" phase is impressed on the leads 57a when the two-pole single-throw switch 52a is closed, that a "b" phase current is impressed on the leads 57b when the two-pole single-throw switch 52b is closed, and that a "c" phase current is impressed on the leads 57c when the two-pole single-throw switch 52c is closed. The remote bus 23 may also supply three phase current to the remote receiving station bus 96 when the three-pole single-throw switch 95 is closed.

Returning again to the sending station it should be noted that the leads 57a are connected to a circuit including a reversing switch 61a, a wave train chopper 79a and a rectifier element 62a. The reversing switch 61a is operated by a conventional plunger element 126a actuated by windings 127a and 128a receiving current from the supply leads 133a, 134a, 135a connected to a suitable source of control current. With the proper supply of current to the windings 127a and 128a the plunger 126a is raised or lowered so as to operate the reversing switch 61a thereby to desirably reverse the "a" phase current flowing in the winding of the transformer 71a.

In the same manner the leads 57b are connected to a current reversing switch 61b, a wave train chopper 79b, a wave chopper 67b a winding of transformer 71b, and a rectifier element short-circuited by the single-pole single-throw switch 63b. The reversing switch 61b is operated by a plunger 126b actuated magnetically in a conventional manner due to the windings 127b, and 128b connected to the supply leads 133b, 134b, and 135b connected to a suitable source of control current. With the proper selection of supply current to the windings 127b and 128b the plunger 126b is raised or lowered so as to operate the conventional reversing switch 61b thereby to reverse when desired the said "b" phase current in the circuit containing the primary winding of the transformer 71b.

The leads 57c are connected to a circuit including a reversing switch 61c, a wave train chopper 79c, a wave chopper 67c, a primary winding of transformer 71c and a rectifier element arranged to be short-circuited by the single-pole single-throw switch 63c. The reversing switch 61c is operated by a conventional plunger 126c actuated in a conventional manner by the windings 127c and 128c receiving control current from the leads 133c, 134c and 135c connected to a suitable source of reversing switch control current. With the proper supply of current to the windings 127c and 128c the plunger 126 is raised or lowered so as to operate the conventional reversing switch 61c thereby to desirably reverse the said "c" phase current in the circuit including the primary winding of the transformer 71c.

All three of the wave train choppers such as 79a, 79b, and 79c are operated by the same motor 74 equipped with a speed control element 75 of any known conventional type, a common shaft 76, and a gear train 77, 80, 83, and 78 so as to secure a relatively great speed reduction so that many alternations of the said polyphase current will occur during one revolution of the said wave train chopper. This chopper motor may be connected between any two leads of the control station bus 49 by leads 53 when the two-pole single-throw switch 58 is closed. It is obvious that the speed of the motor will be the same when operated by the "a", "b", or "c" phase current. The wave train chopper 79a may be eliminated in effect from the "a" phase circuit when the single-pole single-throw switch 81a is closed.

In the same manner the wave train chopper 79b may be removed from the "b" phase circuit by closing the single-pole single-throw switch 81b. Likewise the wave train chopper 79c may be removed from the "c" phase circuit by closing the single-pole single-throw switch 81c.

All of the wave choppers 67a, 67b, and 67c are operated by a motor 64 having a shaft 66 and equipped with a conventional speed control element 65. The motor may be operated on any of the phases, but is shown as operated by the "a" phase current when the three-pole single-throw switch 59 is closed to the leads 54 connected to the control station bus 49. These wave choppers in effect may be removed from the "a", "b", or "c" circuits by the proper selective closing of the switches 68a, 68b, and 68c. In the same manner the rectifiers such as 62a, 62b, and 62c may be removed from the said circuits by the proper closing of the single-pole single-throw switches 63a, 63b, and 63c.

According to the disclosure the wave train choppers will permit intermittent trains of "a", "b", and "c" alternations to flow in the primary windings of the transformers 71a, 71b, and 71c. The wave portion choppers are provided whereby certain portions of these wave trains may be eliminated, and alternations are relatively reversed due to the selective action of the reversing switches 61a, 61b, and 61c. It is thus apparent that one phase current may flow unaffected as other phase alternations are affected. Still further portions or all of "a", "b", and "c" alternations may be rectified by the action of the elements 62a, 62b, and 62c. It is obvious that many combinations of alternations, phases, portions of waves, portions of similar waves portions of different phases in relative phase displacement, portions in displacement and in relative phase opposition, combinations of alternations in an additive or subtractive sense, and many relations of the alternations may cause to flow in the primary winding of the transformers such as 71a, 71b, and 71c.

In any of these operative circumstances, similar currents will be created in the secondary windings of the transformers 71a, 71b, and 71c, and imposed upon the oscillator modulator devices Ao, Bo, and Co, and transmitted either by wire or space methods to a remote receiving station as hereinafter described, when the switches 41a, 41b, and 41c are closed.

The oscillator-modulator devices Ao, Bo, and Co constitute three separate broadcasting stations. They are assumed to be of any known suitable type and to be supplied with operating current by the leads Hs, Fs, and Ss. The low potential cathode exciting current is obtained from the lead Hs, and the high potential space or anode current from the conductor Ss, in turn connected to a three-phase double potential current rectifier Rs connected by leads 84 and 86 and three-pole single-throw switch 85 to the local bus 22. It is understood that the respective oscillator units Ao, Bo, and Co operate at the same or different frequencies as desired.

Any of the resultant induced wave forms produced in the secondary windings of the transformers 71a, 71b, and 71c are in effect input currents and constitute in effect modulating currents imposed by the said transformers upon the modulator-oscillator devices as Ao, Bo, and Co, and may be transmitted when the switches 41a, 41b, and 41c are closed to the local bus 22 through the condensers 32 when the three-pole single-throw switches 33 and 34 are closed. The modulated oscillations may then be transmitted to the transmission line 113 and 140 due to the closure of the switches 20, 16, 136, and 138 as hereinbefore described. The transmission line 140 is a portion of a second transmission system attached to a second source of power such as the generator 10 of the present system.

The modulated carrier current may also be impressed on the antenna 24 of the antenna system as, upon the antenna 25 of the antenna system Bs, and upon the antenna 26 of the antenna system Cs when the three blades of the switch 40 are selectively closed. As any one of the blades of the switch 40 may be closed independently of the others it is evident that either of the antenna systems As, Bs, and Cs may be operated independently of the others. In the same manner any one of the blades of the switch 33 may be closed singly or collectively and thus modified oscillations from only one or more of the units Ao, Bo, or Co will be transmitted over the transmission line 13 by the wire method.

The oscillations of the unit Ao are modulated in a synchronous relation to the alternations of the "a" phase current, the modulations of the oscillations of the unit of the unit Bo are always in a synchronous relation to the alternations of the "b" phase current, and the oscillations of the Co unit are always modulated in some synchronous relation to the alternations of the "c" phase current.

The three-phase system current is produced by the generator 10 in a definite angular relation so also the said modulating currents exist as a function of this same angular relation. Any irregularity of the system waves comprising the said three-phase current will also appear in the said input currents and thus be transmitted by wire or space to a remote receiver.

When the wire method system is employed for the transmission of the modulated oscillations, these modulations still remain in a definite relation to the power alternations passing through the same wire of the transmission line 13, and the said superimposed waves will be held selectively in phase opposition by the proper actuation of the reversing switches 61a, 61b, and 61c.

Assuming the switches 33 and 34 are opened and the switch 40 closed then the modulated carrier currents are broadcast by the space transmission method from the antenna systems As, Bs, and Cs. In this event the superimposed "a" phase, "b" phase, and "c" phase currents will have the same relation to the power current alternations flowing in the transmission line 13 as occurs when the wire transmission method is used as above described.

The modulated carrier currents from the oscillator modulator units Ao, Bo, and Co are transmitted by selected wave channels, either space or wire method, and are received and are demodulated and detected by the devices Ad, Bd, and Cd. These devices constitute a portion of a receiving station obtaining its operating current from the leads Fr, Hr, and Sr. The three-phase double potential rectifier Rr is connected to the remote station power bus 23 and delivers heating current through the conductor Hr and anode or space current through the conductor Sr, while a common return Fr leads to the common brush.

These heating and space currents are employed in the conventional manner in the receiving devices comprising the necessary radio and audio frequency amplifiers and detectors and designated as above indicated as Ad, Bd, and Cd.

Let it be assumed for the purpose of this description that the wire method of carrier current is employed. Consequently the switches 40 and 43 will remain open and the switches 33, 34, 38 and 39 will be closed. The switches 44a, 44b, and 44c will also be closed. In this event the receivers Ad, Bd, and Cd will be connected to the remote station bus 23 and thereby to the transmission line 13 through the condensers 36. The receiver Ad will respond to the carrier currents emitted from the unit Ao and will deliver to the leads 91 and 92, when the two-pole switch 89a is closed, the detected or de-modulated wave portion passed to the modulator Ao. These demodulated wave portions will have a synchronous relation to the alternation of the "a" phase current.

The receiver Bd will respond to the carrier currents emitted from the modulator-oscillator unit Bo and when the two-pole switch 89b is closed will deliver to the leads 93 and 94 the detected or de-modulated wave portion passed to the unit Bo. These de-modulated wave portions will have a synchronous relation to the alternations of the "b" phase system current. The receiver Cd will respond to the carrier currents emitted from the modulator-oscillator unit Co and when the two-pole switch 89c is closed will deliver to the switch terminals the detected or de-modulated wave portion passed to the unit Co. These de-modulated wave portions will have a synchronous relation to the alternations of the "c" phase system current.

If it is desired to employ the space method of carrier current transmission then the switches 33, 34, 39, and 38 will be opened and the switches 40 and 43 closed. The de-modulated currents will be delivered to the switches 89a, 89b, and 89c as just described and in the same synchronous relation.

By either wire or space method the de-modulated current transmitted to the switch 89a will be an "a" phase current, the demodulated current transmitted to the switch 89b will be a "b" phase current, and the de-modulated current transmitted to the switch 89c will be a "c" phase current. Now let it be further assumed for the purpose of this description that only "a" phase currents are being transmitted to the leads 91 and 92. If the switches 81a, 68a, and 63a of the sending station are closed then a continuous train of "a" phase current alternations will be impressed on the modulator-oscillator unit Ao by the transformer winding 71a, and if the proper switches for wire transmission such as 33, 34, 38, and 39 are closed then a continuous train of de-modulated "a" phase alternations will be transmitted to the leads 91 and 92. If the switches 81b, 69b, and 63b are closed then a continuous train of "b" phase alternations will be impressed on the modulator-oscillator unit Bo by the transformer 71b, and as in the case of the "a" alternations there will be transmitted to the leads 93 and 94 a continuous train of de-modulated "b" phase current alternations. If the reversing switch 61b is operated these alternations may be relatively reversed. If the rectifier switch is opened then only the portions not rectified will appear in the circuit including the leads 93 and 94, and these portions may be reversed by the action of the switch 61b. Trains of rectified portions may be intermittently received by the leads 93 and 94 when the switch 81b around the wave train chopper 79b is opened.

The remote station bus 96 may be connected to the remote control bus 23 by closing the three-pole single-throw switch 95. If the leads 101 are connected to the bus 96 by closing the two-pole single-throw switch 104 alternations of the "c" phase system current will be impressed on the said leads. These "c" phase alternations will have a synchronous relation to the de-modulated waves delivered to the switch 89c. If the leads 102 are connected to the bus 96 by closing the two-pole single-throw switch 105 alternations of the "b" phase system current will be impressed on the said leads. These "b" phase alternations will have a synchoronous relation to the de-modulated wave portions delivered to the switch 89b. As hereinbefore described no matter how the "b" phase current has been affected at the sending station by the action of the reversing switch 61b, the wave train chopper 79b, the wave chopper 67b, and the rectifier 62b, the resultant wave will have a synchronous relation to the "b" phase alternations impressed on the leads such as 102. But the leads 102 are connected to the winding 109 of the relay at the receiving station, and current flowing through this winding normally will create a flux that will tend to draw the armature 116 of the relay to the right. In this event the two-pole switch 105 is closed and consequently current flowing from the bus 96 will flow through the conductors 103, 119, and the signal element such as the lamp 123. When the switch 89b is closed the de-modulated "b" phase current will be conducted to the relay winding 110. If a continuous train of "b" de-modulated waves in relative phase opposition and of proper strength are provided then the flux created by same will balance the flux in the core 114 created by the current in the winding 109 so that the armature 116 will no longer be drawn to the right, but will return to the position indicated to light the lamp 124. Hence intermittent trains of "b" phase alternations provided by the action of the wave train chopper 79b of the sending station and transmitted by carrier current from the unit Bo to the receiver Bd will alternatively light the lamps 123 and 124.

The time interval of the alternate lighting of either lamp will be controlled by the length of time between operations of the reversing switch such as 61b and in addition according to the length of time of the wave trains passed by the wave chopper 79b. If it is desired to remotely control all three of the lamps 122, 123, and 124 in a selective manner from the sending station then there is employed de-modulated waves of both the "a" and the "b" phases. When the switch 105 is closed a "b" phase power current will flow in the relay winding 109 as previously described. When the switch 89b is closed a de-modulated "b" phase current will be supplied to the relay winding 110 as above described to operate the relay armature 116 back and forth from the position as shown to the right to selectively light the lamps 124 and 125. If in addition the switch 104 is closed and the third blade from the top of switch 113 is also closed alternations of the "a" phase current will flow in the relay winding 108. If the blade of the switch 113—A is closed to its upper contact then de-modulated "a" phase current will be permitted to flow in the winding of the relay such as 107.

If the de-modulated "b" phase currents in the relay winding 110 are in phase opposition to the "b" phase power alternations flowing in the relay winding 109 then the flux produced by both the windings 109 and 110 will balance each other and the core 114 will have no effect on the armature of the relay such as 116. In the same manner if the de-modulated "a" phase currents flowing in the winding 107 are in opposition and equal to the "a" phase power alternations flowing in the winding 108 then also the flux produced by the windings 107 and 108 will balance each other and the core 115 of the magnet will have no effect on the relay armature 116, and accordingly the armature will remain as shown to light the lamp 124, if the "a" phase de-modulated current is cut off by the action of (say) the wave train chopper 79a of the sending station, then the core 115 of the relay will conduit the flux created by the current flowing in the winding 108 so that the armature 116 will be pulled to the left. In this event the said armature will contact with conductor 117 and thus close the circuit through the signal lamp such as 122.

Similarly, if the "b" de-modulated current is cut off by the action of the wave train chopper 79b of the sending station, then the core 114 of the relay will act to shift the armature 116 to the right and thus light the lamp 123.

Provision in the drawings have been made for the use of two de-modulated currents, but it is within the scope of the invention to use any number of receivers such as the relay shown, and to employ as many de-modulated currents as there are possible phase combinations to the power system.

It is evident from the above description that selective action may be obtained from the use of current from the same phase in the windings such as 108 and 109, or the selective action may be obtained from the use of currents from different phases in the said windings. While there has been a receiver designed to operate magnetically it is understood that any known form of selective receiver could be used by those skilled in the art without departing from the spirit of the invention. For example the power currents and the de-modulated currents could be directly opposed in a circuit, so that the absence of the de-modulated current would permit the power current to operate selective devices.

In further explanation of the action of the differential relay at the receiving station reference is made to the showing in Figs. 3, 4 and 5 which indicate the curves formed under three flux conditions in the coils 107, 108, 109 and 110 of the differential relay when full waves from the power station are passed through the coils 108 and 109. In Fig. 3 power is taken from the power system as heretofore indicated but no radio current is in the coils 110 and 107. There is therefore created two magnetic fields, one in coil 108 and the other in coil 109 which are equal and opposite as indicated by the curves 108c and 109c. As there is no resultant flux to effect the armature 116 it remains in the neutral position as shown at the bottom of Fig. 3.

In the showing in Fig. 4 full waves are passed through coils 108 and 109 and a current of similar frequency is transmitted by radio means through coil 107, as previous described. The flux created by coils 108 and 109 are balanced and are equal and opposite, a resultant flux equal to the flux created by coil 107 and indicated by the curve 107c exists to attract the armature 116 which is pulled to the left as indicated at the bottom of Fig. 4.

Similarly with power current flowing in the coils 108 and 109 and radio current passed through the coil 110 a resultant flux equal to the flux created by the coil 110 and indicated by the curve 110c exists to attract the armature 116 which is pulled to the right as indicated at the bottom of Fig. 5.

Referring to the showing in Figs. 6 and 7 where one-half waves are used, it will be understood that where no radio current is received the flux situation is that shown in Fig. 3.

In the showing in Fig. 6 power current is flowing through coils 108 and 109 forming equal and opposite flux indicated by curves 108c and 109c as previously indicated, and a half wave radio transmitted current is flowing through coil 107. In this case as the half wave current covers a time interval of ninety degrees, there is a gap of from (say) zero position to the ninety degree position and there will be no flux during this interval. During the succeeding quarter interval a flux is indicated by the curve 107d, created in the coil 107 and the armature 116 is pulled to the left as indicated at the bottom of Fig. 6.

Similarly as shown in Fig. 7 where half-wave currents are passed through the coil 110, a flux indicated by curve 107e is formed and acts to pull the armature 116 to the right as indicated at the bottom of Fig. 7.

As the half waves may be either positive or negative, that is as they may be induced from either a half wave positive or negative alternation of current, Fig. 6 shows the curve 107d above the neutral line and Fig. 7 shows the curve 107e below the line.

If other systems are to be included in the given organization the carrier current energy may be impressed on same by means of condensers 137, and switches 136 and 138.

It is apparent that various omissions and substitutions may be made in the embodiment of this invention by those skilled in the art without departing from the spirit of the invention.

Having thus described my invention, I claim
1. In a device of the class described, the combination of an alternating current polyphase power distributing system including a source of power, means for selecting a predetermined portion of each wave cycle in the said system for each phase of the said power, means for broadcasting high frequency carrier currents modulated by the selected portions, means for receiving the carrier waves having the said selected portions impressed thereon including rectifying and amplifying means to reproduce the predetermined portions, electromagnetic circuit closers, means connected to the power distributing system for energizing the said circuit closers, and further means for employing the reproduced portions to cooperate with the energization of said circuit closers from the distributing system whereby said circuit closers will be selectively actuated due to the resultant magnetic actions of the said selected portions and the said alternations.

2. In a circuit system, the combination of an alternating current distributing system, a source of power for said system, a plurality of energy current receivers, a broadcasting station having transmitting circuits and means for impressing selected portions of each wave cycle upon the transmitter circuits to modulate the carrier currents emitted therefrom, a plurality of carrier current receiving sets and circuit controlling devices positioned near said current receivers and having output circuits, means for supplying the alternating current from the distributing system to said means for selecting a wave portion and to said current receivers, so that selected wave portions are transmitted in synchronism with the alternating current in the distributing system, and means operated by the current receivers according to the currents received from the distributing system and by the carrier current to differentially act on said circuit control devices and thus selectively actuate certain of them in synchronism with the energy supplied to the said transmitter circuits of the said broadcasting station.

3. In a circuit system, the combination of an alternating current distribution system, a source of polyphase power, a plurality of current receivers connected to the distributing system to receive power therefrom, a plurality of broadcasting sets connected to the distributing system to receive power therefrom, a plurality of receiving systems connected to the distributing system to receive power therefrom, means connected to the distributing system to select a predetermined portion of each wave cycle from the current passing in the distributing system and connected to the broadcasting sets to modulate the carrier current thereof by the selected wave portion, said carrier currents being of a different frequencies and the connected wave selecting means selecting a portion of the current flowing in a respective phase and impressing the same upon a respective carrier current, said receiving sets being respectively tuned to respective broadcasting sets, current controlling devices, and means operated by the current from the respective receiving sets to actuate the current controlling devices selectively according to the wave portions impressed upon the carrier currents.

4. In a device of the class described, the combination of a source of alternating current, a transmission line connected to said source, means for transmitting a carrier current, means for selecting a portion of a wave cycle of the current flowing from the source of alternating current and impressing the same as a modulator upon the carrier current, means for receiving the transmitted carrier current and converting it into a varying current reproducing the selected portion of each wave cycle, an electro-responsive device, and means connected to the transmission line and operated by the converted current and by the alternating current from the source to control said device.

5. A remote control broadcasting system including means for selecting a predetermined portion of a wave cycle of alternating current wave, means to transmit the selected portion of the wave by a carrier current, means to transmit the alternating current as a whole by a separate channel, means responsive to the broadcast portion and connected to the transmitting means for combining the selected portion of the alternating current with the current transmitted by said separate channel, an electro-responsive device, and means operated by the combined currents to control said device.

6. The combination including a plurality of electro-responsive devices, a source of alternating current for said devices, a differential relay having a circuit closer for each device whereby to connect the devices to said source, said relay including a plurality of flux producing means consisting of a plurality of normally balanced coils disposed end to end with an intervening air space, an armature for the coils electrically connected to said source pivotally mounted and having an end extending into said space and constituting a movable contact for said circuit closers, means to select a predetermined portion of a wave cycle of the said current from said source, modulating and transmitting means to transmit the selected portion as the modulant of a carrier current, means for demodulating the reproduced selected portion upon one of the said flux producing means of the relay, and a transmission line connected to said source and to another of said flux producing means, whereby the differential effects of said flux producing means will energize said flux actuated devices to operate said circuit closer.

7. A remote control system including a source of alternating current power, a transmission line distributing system for said power, a plurality of electro-responsive devices, a carrier current generating and modulating apparatus and a carrier current receiving and demodulating apparatus, and means operating synchronously with the current from said source to select a predetermined portion of each wave cycle of said current and impress the same as a modulant upon said carrier current generating and modulating apparatus, whereby the same may be transmitted to the receiving and demodulating apparatus, and means connected to said distributing system and to said receiving and demodulating apparatus and including differentially operated devices energized by the current from said receiving and demodulating apparatus and from said distributing system for selectively actuating said devices in accordance with the operation of the selecting means.

8. In a circuit system, a source of low frequency energy, a source of high frequency energy, energized from the source of low frequency energy, a receiving device connected to said sources to receive both low and high frequency energy therefrom, means to select a predetermined portion of a wave cycle of the low frequency energy and impress the same upon the high frequency energy, as a modulant thereof, said receiving device including means operating to demodulate the high frequency energy and reproduce the selected portion of the wave cycle, circuit closers, and means selectively energized by the low frequency current and the selected portion of the wave cycle as demodulated for controlling the circuit closers.

9. In a device of the class described, an alternating current power line, a device to select a certain portion of each wave, means including a timing switch to admit current from the power line to said selecting device, a carrier current transmitting apparatus to receive the selected portion of the waves and transmit the same as a modulant of the carrier current, a receiving station including a demodulating device to reproduce the selected portions of the wave, an electro-responsive device, a control therefor, means operatively responsive to the reproduced selected portion for the time interval during which said switch admits current from the power line to the selecting device.

10. In a device of the class described, an alternating current power line, a carrier current transmitting apparatus, including a modulator, a first circuit closing device connected to said power line for admitting an alternating current wave train of predetermined length from said line to said modulator at a predetermined period of time, a second circuit closing device connected in series with said first circuit closing device to select a certain portion of each wave cycle, a receiving station including a demodulator to reproduce from the carrier current the selected portion of the waves, and a relay having balanced windings excited from the power line so that the magnetization in the relay is in synchronism with the selected portion of the waves as reproduced at the receiving station, said relay including means operated by the wave portions to upset the balance to close the relay contacts, so that the first circuit closing device determines the length of duration of the upsetting of the said balance.

11. In a device of the class described, an alternating current power line, a carrier current transmitting apparatus, including a modulator, a first circuit closing device connected to said power line for admitting an alternating current wave train of predetermined number of alternations from said line to said modulator at a predetermined period of time, and a second circuit closing device connected in series with said first circuit closing device to select a certain portion of each wave cycle, a receiving station including a demodulator to reproduce from the carrier current transmitting apparatus the selected portion of the waves, and a relay having balanced windings excited from the power line so that the magnetization in the relay is in synchronism with the selected portion of the waves as reproduced at the receiving station, said relay including means operated by the wave portions to upset the balance to close the relay contacts so that the first circuit closing device determines the length of duration of the upsetting of the said balance.

12. In a device of the class described, an alternating current power distribution system, a device connected to the system to select a predetermined portion of each wave cycle, a carrier current transmitting apparatus to receive the selected portion and transmit it as a modulant of the carrier current, a receiving station including a demodulating device to reproduce from the carrier current the selected portion of the waves, an electro-responsive device and means actuated by the reproduced selected portion for operating said device.

HOWARD J. MURRAY.